Jan. 8, 1952  F. L. CHASE, JR., ET AL  2,581,751
METHOD OF FORMING SIDE SEAMS IN METAL CAN BODIES
Filed Jan. 29, 1945

*Inventors*
*Fred L. Chase, Jr.*
*Henry G. Maeder, Jr.*
By Theodore C. Browne
*Attorney*

Patented Jan. 8, 1952

2,581,751

UNITED STATES PATENT OFFICE 2,581,751

METHOD OF FORMING SIDE SEAMS IN METAL CAN BODIES

Fred L. Chase, Jr., Dedham, and Henry G. Maeder, Jr., Belmont, Mass., assignors to Dewey and Almy Chemical Company, North Cambridge, Mass., a corporation of Massachusetts Application January 29, 1945, Serial No. 575,196

1 Claim. (Cl. 113—120)

There are two types of seams in a sanitary can, the end seam and the body or side seam. The end seams are made tight by a gasket of a rubber-like composition which is first placed on the end adjacent the curl and is compressed between the end and the body in the formation of the double seam.

Referring to the drawing.

Figure 1:
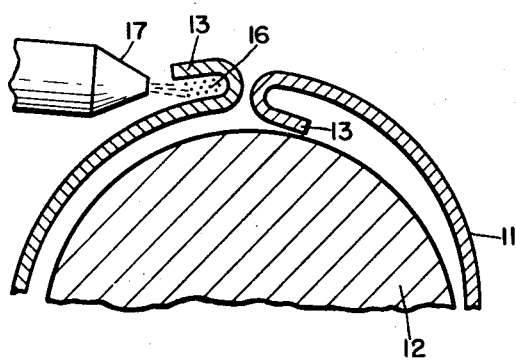
Figure 1 is a cross-sectional view of a conventionalized can bodymaking machine showing the application of the side seam compound to the body hook of the can body.
Figure 2:
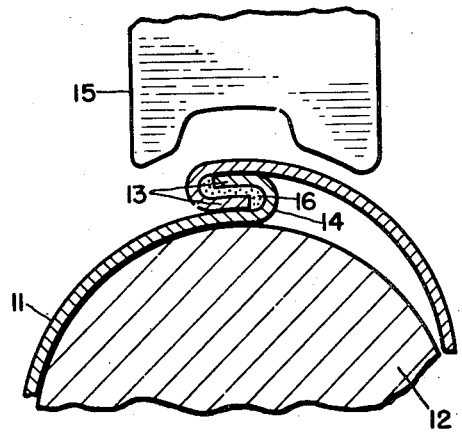
Figure 2 is another cross-sectional view of the same machine showing the can body with its compound filled body hooks interlocked and in position under the seam forming hammer.

In a conventional can bodymaking machine, can body 11 is progressively moved along horn or anvil 12. Body hooks 13 may be formed in the can body either while the body is on the machine or during some prior operation. The can body 11 with formed body hooks 13 is wrapped around anvil 12 and the body hooks are interlocked as shown at 14. The interlocked body hooks are then bumped by contoured hammer 15 to form the side seam of the can. Only those operations of the bodymaker as are necessary in the performance of the method of the present invention are shown in the drawing, and the drawing does not purport to show any particular bodymaker.

Figure 3:
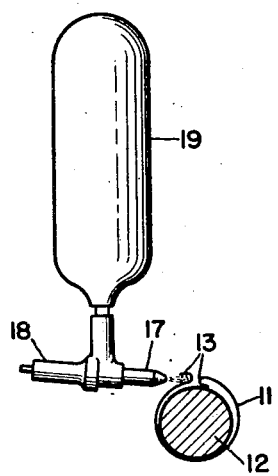
Figure 3 is another view of the same cross-section as shown in Figure 1, showing the arrangement of the compound dispensing container and the compound applying nozzle.

The side seam compound, shown at 16, may be placed in one of the body hooks 13 by means of nozzle 17 at any point during the side seaming operation after the body hooks are formed and prior to the time that the hooks are interlocked. The compound, which consists of compounded rubber dissolved in a normally gaseous solvent, is shipped in and dispensed under pressure from a conventional pressure container 19 such as that used for liquified gases. The pressure container 19 is attached to a nozzle assembly 18 and the compound released through nozzle 17 into the body hook 13 as shwn in Figure 3. The nozzle assembly 18 shown, is a conventional nozzle used in the can sealing art, although any nozzle having substantially instantaneous opening and closing characteristics may be used. The valve mechanism of the nozzle may be interconnected with the bodymaking machine in any conventional fashion.

The body seams, conventionally, are soldered, interlocked hooks. Bodies are made at very high speed. Three hundred or four hundred blanks a minute are wrapped around the horn; the seam hooks are interlocked and bumped by a contoured hammer. The bodies then pass over a soldering roll where the seam is flooded with solder, past the wipers where the excess solder is removed, and then the bodies leave the horn.

The ends, however, are made separately. After blanking and channeling, the edge is curled. The ends pass to a "lining" machine. This, essentially, is a rotary chuck which revolves the end beneath a fixed squirt gun at such a speed that considerable centrifugal force is developed. The gun fills the channel with a flowable can sealing compound (a plastic composition with rubber-like characteristics) and the centrifugal force, which then exceeds the yield value of the plastic[1] compound, slides the compound under the curl. Thereafter, the lined ends pass to a drier where the liquid components (usually water, for can sealing compounds are commonly water dispersions) are dried out. Frequently, the lining is vulcanized in the drying operation. All operations connected with "lining" are carried out with great care, particularly the drying, for if the vaporization is too rapid, pin-holes, cracks and blisters will appear in the lining, and since these persist even after double seaming, will, if permtted, allow the passage of gas or bacteria through the seal. The completed ends meet the bodies at the double seamer station where the bottom end is double seamed onto the can body. The other end is shipped with the can to the packer, who, after filling the can, double seams the top end in place in a machine which is practically identical with that used by the manufacturer to apply the bottom.

Can sealing compound, therefore, is a material which must be liquid to pass through the squirt gun, then plastic to stay in place under the curl, and which can be converted by controlled drying to a continuous, crack-free gasket tough and resistant enough to withstand, without tearing or rupture, the forces in the double seaming operation which are about 70,000 lbs. per square inch.

Can sealing compounds cannot be used in body seams, for the speed of the body-maker precludes drying, and the plasticity of the wet compound allows it to squirt out of the seam as it is hammered shut.

We have discovered that a compound may be made having instantaneous drying characteris-

---

[1] The word "plastic" is used in its scientific sense, i. e., a substance which resists flow until a pressure equal to its yield value is applied, yet is capable of flowing thereafter so long as that pressure is applied.

tics, and consequently producing a film which is badly disrupted by the evolution of vapor, but which nevertheless possesses the property of re-uniting under pressure into a continuous, effective sealing mass. If the base materials are properly chosen, this compound, when in the body seam, is resistant to the solvent action of lubricating oils, paint oils, and most ordinary solvents, so that it is now possible to use black iron and still produce a leak-proof can for lubricating oils, paints, etc. Black iron is perfectly satisfactory for holding such materials. Tin plate has previously been used only because soldering the side seam was necessary.

It is the object of this invention to produce an effective side seam compound which may be applied adjacent the hooks by the conventional squirt gun technique, and which will not be displaced when the seam is hammered shut, and which will permit the operation of a body maker at its present high speed.

In carrying out our invention, we make a solvent solution of natural rubber or artificial polymers and copolymers possessing rubber-like characteristics, for example: butadiene-styrene copolymers (G. R. S.), butadiene-acrylonitrile copolymers (G. R. N.), and the polychloroprenes.

The solvent must be a gas at normal temperatures and pressures. Preferably, compounding and reinforcing ingredients and, if desired, vulcanizing materials are milled into the rubber on rolls or in a Banbury mill. The compounded rubber batch is then placed in a cement churn so arranged that it may be operated under substantial pressures. The solvent as a liquid under pressure is then run into the churn and churning continued until a smooth rubber cement-like liquid compound results. The compound is pumped into shipping bombs which act as dispensers at the can factory.

Ordinarily, the vapor pressure in the bomb is sufficient to operate the squirt-gun and, when the nozzle is opened, a stream of compound is deposited on the can body adjacent the body hook.

As soon as the compound touches the steel, it becomes a solid mass which, however, is full of pits and blisters because of the eruption of solvent vapor. Assuming normal production speeds on the body maker, a small proportion of solvent is retained by the rubber. This leaves the mass in a tacky, cohesive condition so that it is immediately compacted into a hermetic seal as the seam is hammered. When a very volatile gas such as butadiene is used, greater flexibility in manufacture of the can is permitted if a small proportion of a more stable solvent is added to the compound. In such cases, we prefer to add a small amount of a volatile liquid solvent, which may be one of various petroleum fractions, toluol, xylene, hydrogenated naphthas etc., to the original mixture in the churn rather than rely for the sole control of cohesiveness on the specfic retention of the gaseous solvent by the rubber.

In the following examples all parts are by weight.

Exampe I

Rubber batch:
    Rubber (G. R. S. Buna) _____ 300
    Symmetrical dibetanaphthyl paraphenylene diamine _____ 6
    Zinc oxide _____ 562.5
    Ester gum _____ 180
    Carbon black _____ 1.5

These ingredients are milled in a Banbury mixer.

Churn batch:
    Rubber batch (as above) _____ 650
    Tertiary buty catechol _____ 1
    Butadiene _____ 564
    Norma hexane _____ 141

These ingredients are worked in a pressure churn until a smooth cement-like composition results.

Example II

Rubber batch:
    Rubber (smoked sheets) _____ 300
    Symmetrical dibetanaphthyl paraphenylene diamine _____ 6
    Zinc oxide _____ 562.5
    Ester gum _____ 180
    Carbon black _____ 1.5

These ingredients are milled in a Banbury mixer.

Churn batch:
    Rubber batch (as above) _____ 650
    Tertiary butyl catechol _____ 1
    Butadiene _____ 564
    Normal hexane _____ 141

These ingredients are worked in a pressure churn until a smooth cement-like composition results.

Example III

Rubber batch:
    Chlorobutadiene 1.3 polymer (neoprene (G. N.) _____ 300
    Symmetrical dibetanaphthyl paraphenylene diamine _____ 6
    Zinc oxide _____ 562.5
    Ester gum _____ 180
    Carbon black _____ 1.5

These ingredients are milled in a Banbury mixer.

Churn batch:
    Rubber batch (as above) _____ 650
    Tertiary butyl catechol _____ 1
    Ethyl chloride _____ 705

These ingredients are worked in a pressure churn until a smooth cement-like composition results.

Example IV

Rubber batch:
    Acrylonitrile-butadiene copolymer (G. R. N.) _____ 300
    Symmetrical dibetanaphthyl paraphenylene diamine _____ 6
    Zinc oxide _____ 562.5
    Ester gum _____ 180
    Carbon black _____ 1.5

These ingredients are milled in a Banbury mixer.

Churn batch:
    Rubber batch (as above) _____ 650
    Tertiary butyl catechol _____ 1
    Ethyl chloride _____ 705

These ingredients are worked in a pressure churn until a smooth cement-like composition results.

The above and similar compositions effectively seal seams in black iron, tin or terne plate containers. The solvent evaporates so quickly that the seam can be hammered or rolled at present day commercial seaming rates without danger of squirting or squeezing the compound out of the seam. The tacky, cohesive, but very tough deposits which are left after the evaporation of the gaseous solvent are packed in the seam to a dense, hermetic sealing mass. Because they may be applied to the metal by the speedy squirt gun technique and because they instantly become a tacky, sealing mass when on the metal, they may be used to replace the soldered side seam of a can without reducing the production speed of present day body makers.

We claim:

In the art of forming side seams in a metallic can body at commercial machinery side seaming speed wherein a sealing compound is interposed between two body hooks which are then interlocked, that improvement which includes providing a supply of liquid can sealing compound comprising a filler, a rubbery polymer selected from the class consisting of natural rubber, copolymers of butadiene and styrene, copolymers of butadiene and acrylonitrile, and polychloroprenes dissolved in a sovlent for the polymer which is gaseous at normal temperatures and pressures, maintaining said compound in a container under the super-atmospheric vapor pressure of the solvent for the polymer, flowing the compound through a nozzle the open end of which is exposed to atmospheric pressure to form a band of compound lying within and along the extent of one of said body hooks whereby because of the sudden reduction in pressure and the consequent instantaneous ebullition of the now gaseous solvent the band is converted into a puffed, bubble- and pit-filled solid, then cohesively uniting the bubble- and pit-walls of said solid to form a dense, continuous, hermetic sealing mass by applying pressure between the external body hook and a support for the can body and simultaneously distorting the metal to form an interlocked side seam without squirting or squeezing the sealing compound out of the seam.

FRED L. CHASE, Jr.
HENRY G. MAEDER, Jr.

REFERENCES CITED

The following references are of record in the file of this patent:

UNITED STATES PATENTS

| Number | Name | Date |
|---|---|---|
| Re. 12,959 | Brenzinger | May 25, 1909 |
| 1,171,187 | Glidden | Feb. 8, 1916 |
| 1,178,721 | Hofmann | Apr. 11, 1916 |
| 1,180,661 | Kruse | Apr. 25, 1916 |
| 1,352,641 | Troyer | Sept. 14, 1920 |
| 1,467,356 | Cook | Sept. 11, 1923 |
| 1,544,810 | Clancy | July 7, 1925 |
| 1,910,847 | Maximoff | May 23, 1933 |
| 2,093,422 | Diamond | Sept. 21, 1937 |
| 2,119,280 | Kronquest | May 31, 1938 |
| 2,304,833 | Korwan | Dec. 15, 1942 |
| 2,399,558 | McArdle et al. | Apr. 30, 1946 |
| 2,401,015 | Perkins | May 28, 1946 |

FOREIGN PATENTS

| Number | Country | Date |
|---|---|---|
| 345,039 | Great Britain | Mar. 16, 1931 |
| 533,669 | Great Britain | Feb. 18, 1941 |
| 811,418 | France | Jan. 14, 1937 |